United States Patent [19]
Kochetkova et al.

[11] Patent Number: 5,212,134
[45] Date of Patent: May 18, 1993

[54] CATALYST OF LIQUID-PHASE OXIDATION OF SULFUR-CONTAINING COMPOUNDS

[76] Inventors: Raisa P. Kochetkova, mikroraion 18; Ljudmila I. Shpilevskaya, mikroraion 9, 19, kv. 119; Ida P. Shiverskaya, ulitsa Geroey; Anatoly F. Babikov, ulitsa Moskovskaya, all of Angarsk; Raisa M. Zaikova, ulitsa Tselljuloznikov, 1, kv. 1, Baikalsk; Fedor K. Shmidt, mikroraion "Primorsky", 14, kv. 5, Irkutsk; Oleg A. Gurenko, kvartal 89, 9, kv. 12, Angarsk; Valery V. Glazyrin, ulitsa Tselljuloznikov, 2, kv. 2, Baikalsk; Gennady P. Tikhonov, ulitsa Gagarina, 170, kv. 16, Baikalsk; Vasily I. Usov, ulitsa Gagarina, 148, kv. 12, Baikalsk; Anatoly A. Popov, kvartal 74, 4a, kv. 45; Semen A. Eppel, ulitsa Krasnaya, 4, kv. 10, both of Angarsk; Gennady I. Botkin, deceased, late of Angarsk; by Valentina I. Botkina, administrator, 17 mikroraion, 22, kv. 48, Angarsk; by Olga G. Botkina, administrator, 17 mikroraion, 22, kv. 48, Angarsk; by Natalya G. Botkina, administrator, 17 mikroraion, 22, kv. 48, Angarsk; by Alexei G. Botkin, administrator, 17 mikroraion, 22, kv. 48, Angarsk, all of U.S.S.R.

[21] Appl. No.: 474,740
[22] PCT Filed: Aug. 14, 1989
[86] PCT No.: PCT/SU89/00210
§ 371 Date: Jul. 29, 1991
§ 102(e) Date: Jul. 29, 1991
[87] PCT Pub. No.: WO90/01369
PCT Pub. Date: Feb. 22, 1990

[30] Foreign Application Priority Data

Aug. 15, 1988 [SU] U.S.S.R. ............... 4474445
Sep. 19, 1988 [SU] U.S.S.R. ............... 4483532
Jun. 12, 1989 [SU] U.S.S.R. ............... 4697938

[51] Int. Cl.$^5$ ............... B01J 23/72; B01J 31/06
[52] U.S. Cl. ............... 502/159; 502/163; 502/229; 502/331; 502/338
[58] Field of Search ............... 502/159, 163, 229, 331, 502/338

[56] References Cited

U.S. PATENT DOCUMENTS

| | | | |
|---|---|---|---|
| 4,478,808 | 10/1984 | Matros et al. | 423/522 |
| 4,556,547 | 12/1985 | Nishino | 423/230 |
| 4,574,121 | 3/1986 | Frame | 502/163 |
| 4,672,047 | 6/1987 | Chandler | 502/62 |

*Primary Examiner*—Patrick P. Garvin
*Assistant Examiner*—Brent M. Peebles
*Attorney, Agent, or Firm*—Lilling & Lilling

[57] ABSTRACT

The invention relates to the heterogeneous catalysis.

A catalyst according to the invention contains the following components in % by mass:

| | |
|---|---|
| product of calcination of iron oxide based pyrite | 30–50 |
| thermoplastic polymer | the balance. |

The invention may be used in various industries, e.g. in the oil refinery.

3 Claims, No Drawings

CATALYST OF LIQUID-PHASE OXIDATION OF SULFUR-CONTAINING COMPOUNDS

TECHNICAL FIELD

The invention relates to the heterogeneous catalysis, and in particular, it deals with a catalyst of liquid-phase oxidation of sulfur-containing compounds.

BACKGROUND ART

Known in the art is a catalyst of liquid-phase oxidation of sulfur-containing compounds containing as active components hard coal ash and cobalt phthalocyanine and a thermoplastic polymer, in particular, polyethylene as a carrier, with the following proportioning of components, in % by mass:

| | |
|---|---|
| hard coal ash | 40–50 |
| cobalt phthalocyanine | 1–5 |
| thermoplastic polymer | the balance |
| (SU, A, 1154772). | |

The prior art catalyst referred to above has a comparatively high catalytic activity and selectivity with respect to sulfur both in the purification of effluents containing hydrogen sulfide in an amount of up to 100 mg/l and in the regeneration of absorbing solution used for the purification of a production gas from hydrogen sulfide with a hydrogen sulfide content in the gas of up to 0.5% by vol. when pH of the oxidized solutions is maximum 8.0. Thus, in oxidizing 110 mg/l of hydrogen sulfide in effluents in the presence of the prior art catalyst during ten minutes with the air supply rate of 50 cm$^3$ per 1 mg of hydrogen sulfide at a gauge pressure of 0.3 MPa and at 20° C. and pH of 7.5; 8.5; and 9.5 the degree of oxidation of hydrogen sulfide is 98.5; 92.2; and 97.7%, respectively. In oxidizing 1020 mg/l of hydrogen sulfide under the abovementioned conditions, the degree of oxidation of hydrogen sulfide decreases to 96.8; 97.2; and 89.7%, respectively. Complete oxidation of 110 mg/l of hydrogen sulfide in effluents with their pH of 7.5 and 8.5 was achieved in 12–15 minutes and in 23–25 minutes with pH of 9.5. With a content of hydrogen sulfide in effluents of 1020 mg/l complete oxidation of hydrogen sulfide at pH of 7.5 and 8.5 is achieved in 23–25 minutes and in 40–45 minutes with pH of 9.5.

The prior art catalyst is also deficient in that it incorporates an expensive active component—cobalt phthalocyanine which is used in rather high concentrations (up to 5% by mass). It is, therefore, desirable to make use of a cheaper catalyst which is at least as active as the prior art catalyst for organizing commercial purification of effluents.

Also known in the art is a catalyst of liquid-phase oxidation of sulfur-containing compounds containing as an active component hard coal ash and a thermoplastic polymer such as polyethylene as a carrier, with the following proportioning of components, in % by mass:

| | |
|---|---|
| coal ash | 40–50 |
| thermoplastic polymer | the balance |
| (SU, A, 1057096). | |

The prior art catalyst has a high enough catalytic activity. Thus, complete oxidation of hydrogen sulfide in formation fluid with a starting concentration of 90 to 110 mg/l, at a rate of oxidant (air) supply of 100 cm$^3$ per 1 mg of hydrogen sulfide at 20° C. and at the pressure of 0.3 MPa occurs during 30 minutes of oxidation.

In carrying out a production process using prior art catalysts, large-size industrial installations have to be constructed so as to result in an increase in capital investments and operation cost.

A highly-active and polyphase catalyst is needed for the purification of effluents containing, in particular, hydrogen sulfide over a broad range of concentrations and pH values, which should be capable of sorbing oxygen at one of its phases and a sulfur-containing component at the other phase while ensuring their activation and supply to active centers of the catalyst.

The catalyst should also ensure a stable and high overall oxidation rate over a wide range of pH values and compsotiion of sulfur-containing compounds and their mixtures fed for oxidation.

SUMMARY OF THE INVENTION

It is the main object of the invention to enhance activity of the catalyst.

An important object of the invention is to intensify the process of liquid-phase oxidation of sulfur-containing compounds using this catalyst in media with a high concentration of hydrogen sulfide and mercaptans within a wide range of pH values.

The above objects are accomplished by that a catalyst of liquid-phase oxidation of sulfur-containing compounds, comprising an active component and a thermoplastic polymer, according to the invention, comprises an active component in the form of a product of calcination of iron oxide based pyrite, with the following proportioning of components in % by mass:

| | |
|---|---|
| product of calcination of iron oxide based pyrite | 30–50 |
| thermoplastic polymer . | the balance. |

The catalyst according to the invention allows the process of oxidation of sulfur-containing compounds to be carried out 3 to 8 times as fast. Thus, an oxidation rate of hydrogen sulfide is up to 98.5 to 99.0% with its content in effluents of 1020 mg/l at pH of 7 to 10.0 with an oxidation time of 5 to 15 minutes and an air supply rate of 50 cm$^3$ per 1 mg of hydrogen sulfide.

The use of the catalyst according to the invention in the process of oxidation of sulfur-containing compounds under comparatively large fluctuations of starting concentration, in particular, of hydrogen sulfide (up to 1020 mg/l) ensures complete oxidation of hydrogen sulfide with a shorter oxidation period (five minutes instead of 20 minutes). All this results in a decrease in capital investments and operation cost in purifying large volumer of sulfur-containing effluents and gas emissions.

To retain high intensity of the process of liquid-phase oxidation of such sulfur-containing compounds as a mixture of hydrogen sulfide and mercaptans in effluents with their total concentration of up to 1020 mg/l and for oxidizing hydrogen sulfide in absorbent solutions used for the recovery of hydrogen sulfide from production gases containing up to 1–5% by vol. of hydrogen sulfide, with high selectivity with respect to sulfur, it is desirable to make use of a catalyst which also contains cobalt phthalocyanine, with the following proportioning of components in % by mass:

| | |
|---|---|
| product of calcination of iron oxide based pyrite | 40–50 |
| cobalt phthalocyanine | 0.5–1.0 |
| thermoplastic polymer | the balance. |

Adding cobalt phthalocyanine to the catalyst according to the invention makes it possible to increase quantity of active centers on the geometrical surface of the catalyst so as to ensure the chemical sorption of oxygen while activating it to radical ions of $O_2^-$ and $O_1^-$. This oxygen easily oxidizes hydrogen sulfide in absorbent solutions and effluents with much lower air supply rates. Thus only 10 cm$^3$ of an oxidant are needed to oxidize 1 mg of hydrogen sulfide instead of 30 cm$^3$, i.e. three times as small quantity can be used, the selectivity with respect to sulfur at pH 7 of the solution being 99.6%. and this value experiences but a slight decrease at pH 9 to 96.4% and to 95.5% at pH 10.

It is preferred to retain high degree of purification and to intensify the process of oxidation of sulfur-containing compounds, in carrying out the purification of gas emissions in the form of a gas and liquid mixture having high concentrations of hydrogen sulfide up to 3500 mg/m$^3$ and merceptans up to 8100 mg/m$^3$, that a catalyst contain also copper oxide with the following proportioning of the components of % by mass:

| | |
|---|---|
| product of calcination of iron oxide based pyrite | 30–40 |
| copper oxide | 3–7 |
| thermoplastic polymer | the balance. |

The use of copper oxide in the catalyst results in an increase in the number of phases so as to substantially enhance chemical sorption of oxygen on the catalyst surface while ensuring its activation and formation of radical ions $O_2^-$ and $O_1^-$ which readily oxidize hydrogen sulfide and mercaptans available in gas and liquid mixtures.

BEST MODE OF CARRYING OUT THE INVENTION

The catalyst according to the invention is prepared by blending a thermoplastic polymer and an active component—a product of calcination of iron oxide based pyrite at the polymer melting point, with subsequent molding. Thermplastic polymer ensures a reliable retention of the active component of the catalyst so as to provide for its high mechanical strength and hydrolytic resistance during liquid-phase oxidation of sulfur-containing compounds. The mechanical wear of catalyst granules during operation does not result in a decrease in its activity owing to the renewal of the surface and involvement of new active particles available in the bulk of the polymer in the process.

High catalytic activity of the catalyst according to the invention occurs with the abovementioned proportioning of components of the catalyst. A decrease in the content of the active component in the form of a product of calcination of iron oxide based pyrite in the catalyst below 30% by mass lowers its catalytic activity, and an increase in excess of 50% by mass lowers mechanical strength of the resultant catalyst so that the catalyst becomes unfit for use.

A product of calcination of iron oxide based pyrite used in the catalyst according to the invention contains, in particular, the following components in the following proportioning in % by mass:

| | |
|---|---|
| Fe$_2$O$_3$ | 81.00–85.00 |
| FeO | 4.00–5.00 |
| SO$_3$ | 3.6–3.9 |
| CoO | 1.30–1.50 |
| Al$_2$O$_3$ | 2.70–2.9 |
| SiO$_2$ | 3.60–4.00 |
| CaO | 2.00–2.5 |
| MgO | 0.26–0.30 |
| K$_2$O | 0.35–0.40 |
| Na$_2$O | 0.29–0.35 |
| as well as trace elements in % by mass: | |
| Ba | 0.027–0.03 |
| Pb | 0.0060 |
| Cr | 0.0020 |
| Mn | 0.0076 |
| Ni | 0.0009 |
| Zn | 0.1000 |
| La | 0.0007 |
| V | 0.0035. |

The catalyst may contain a thermoplastic polymer in the form of low-density polyethylene, polypropylene.

For a better understanding of the invention, examples of its practical implementation will be given below.

EXAMPLE 1

The catalyst of liquid-phase oxidation of sulfur-containing compounds according to the invention consisting of the following components in % by mass:

| | |
|---|---|
| product of calcination of iron oxide based pyrite | 50 |
| low-density polyethylene | the balance | was prepared by blending 30 g of a product of calcination of iron oxide based pyrite and 30 g of granulated low-density polyethylene. The resultant mixture was stirred to obtain a homogeneous mass at the melting point of polyethylene of 110°–130° C. and was then molded in the form of granules or chip cut from a catalyst bar on a lathe.

The catalyst was then loaded into a batch metal reactor having a thermostating jacket, a dispergator plate in the bottom part of the reactor, and a precision pressure gauge for controlling working pressure. Air was supplied from a bottle through a reducing valve, and metering was carried out using a rheometer at the outlet of the reactor. Blowing gases passed through a system of hydrogen sulfide control absorbers.

Sweage effluents (300 ml) containing 3 g/l of mineral salts (NaCl and CaCl$_2$), 1020 mg/l of hydrogen sulfide, pH=7 were oxidized in the presence of 30 g of the catalyst according to the invention containing in % by mass:

| | |
|---|---|
| product of calcination of iron oxide based pyrite | 50 |
| low-density polyethylene | the balance. |

Oxidation was carried out under static conditions at room temperature, at the pressure of 0.3 MPa during five minutes with the air supply rate of 10 l per 1 l of effluent being oxidized.

Tests aimed at determining the residual concentration of hydrogen sulfide in effluents being purified by the potentiometric method were carried out to assess the catalytic activity of the catalyst.

The test results are given in the Table below.

EXAMPLE 2

The catalyst of liquid-phase oxidation of sulfur-containing compounds consisting of the following components in % by mass:

| product of calcination of iron oxide based pyrite | 45 |
| --- | --- |
| low-density polyethylene | the balance | was prepared and tested as described in Example 1. The test results are given in the Table below.

EXAMPLE 3

The catalyst for liquid-phase oxidation of sulfur-containing compounds according to the invention consisting of the following components in % by mass:

| product of calcination of iron oxide based pyrite | 30 |
| --- | --- |
| low-density polyethylene | the balance | was prepared and tested as described in Example 1. The test results are given in the Table below.

EXAMPLE 4

The catalyst of liquid-phase oxidation of sulfur-containing compounds according to the invention consisting of the following components, in % by mass:

| product of calcination of iron oxide based pyrite | 40 |
| --- | --- |
| cobalt phthalocyanine | 0.7 |
| low-density polyethylene | the balance | was prepared and tested as described in Example 1. The test results are given in the Table below.

EXAMPLE 5

The catalyst of liquid-phase oxidation of sulfur-containing compounds according to the invention consisting of the following components in % by mass:

| product of calcination of iron oxide based pyrite | 45 |
| --- | --- |
| cobalt phthalocyanine | 0.5 |
| low-density polyethylene | the balance | was prepared and tested as described in Example 1. The Test results are given in the Table below.

EXAMPLE 6

The catalyst of liquid-phase oxidation of sulfur-containing compounds according to the invention consisting of the following components, in % by mass:

| product of calcination of iron oxide based pyrite | 45 |
| --- | --- |
| cobalt phthalocyanine | 1 |
| low-density polyethylene | the balance | was prepared and tested as described in Example 1. The test results are given in the Table below.

EXAMPLE 7

The catalyst of liquid-phase oxidation of sulfur-containing compounds consisting of the following components, in % by mass:

| product of calcination of iron oxide based pyrite | 35 |
| --- | --- |
| copper oxide | 3 |
| low-density polyethylene | the balance | was prepared and tested as described in Example 1. The test results are given in the Table below.

EXAMPLE 8

The catalyst of liquid-phase oxidation of sulfur-containing compounds according to the invention consisting of the following components in % by mass:

| product of calcination of iron oxide based pyrite | 35 |
| --- | --- |
| copper oxide | 5 |
| low-density polyethylene | the balance | was prepared and tested as described in Example 1. The test results are given in the Table below.

EXAMPLE 9

The catalyst of liquid-phase oxidation of sulfur-containing compounds according to the invention consisting of the following components in % by mass:

| product of calcination of iron oxide based pyrite | 35 |
| --- | --- |
| copper oxide | 7 |
| low-density polyethylene | the balance | was prepared and tested as described in Example 1. The test results are given in the Table below.

| Examples | Catalyst activity in terms of degree of oxidation | | Sulfur-containing compound oxidation time, minutes | Selectivity with respect to sulfur |
| --- | --- | --- | --- | --- |
| | hydrogen sulfide | mercaptans | | |
| | 65.6 | — | 5 | — |
| 2 | 68.1 | — | 5 | — |
| 3 | 45.6 | — | 5 | — |
| 4 | 99.1 | 98.8 | 5 | 97.1 |
| 5 | 99.8 | 99.7 | 5 | 99.0 |
| 6 | 99.4 | 98.7 | 5 | 99.1 |
| 7 | 99.6 | 99.1 | 3 | — |
| 8 | 100.0 | 100.0 | 3 | — |
| 9 | 100.0 | 99.8 | 3 | — |
| Prior art (SU, A, 1057096) | 39.7 | — | 5 | — |

INDUSTRIAL APPLICABILITY

The invention may find application in the paper and pulp manufacture, in the oil refinery, gas production, leather processing and other industries for the purification of gas emissions and effluents from sulfur-containing compounds.

We claim:

1. A catalyst of liquid-phase oxidation of sulfur-containing compounds, comprising an active component and a thermoplastic polymer, characterized in that as an active component it contains a product of calcination of iron oxide based pyrite, with the following proportioning of the components in % by mass:

| | |
|---|---|
| product of calcination of iron oxide based pyrite | 30–50 |
| thermoplastic polymer | the balance. |

2. A catalyst of liquid-phase oxidation of sulfur-containing compounds according to claim 1, characterized in that it additionally comprises cobalt phthalocyanine, with the following proportioning of the components in % by mass:

| | |
|---|---|
| product of calcination of iron oxide based pyrite | 40.0–50.0 |
| cobalt phthalocyanine | 0.5–1.0 |
| thermoplastic polymer | the balance. |

3. A catalyst of liquid-phase oxidation of sulfur-containing compounds according to claim 1, characterized in that it additionally comprises copper oxide, with the following proportioning of the components in % by mass:

| | |
|---|---|
| product of calcination of iron oxide based pyrite | 30.0–40.0 |
| copper oxide | 3.0–7.0 |
| thermoplastic polymer | the balance. |

* * * * *